United States Patent [19]

Kirstein

[11] Patent Number: 5,061,017
[45] Date of Patent: Oct. 29, 1991

[54] HYDRAULIC DUAL-CIRCUIT BRAKE SYSTEM

[75] Inventor: Lothar Kirstein, Ditzingen, Fed. Rep. of Germany

[73] Assignee: Robert Bosch GmbH, Stuttgart, Fed. Rep. of Germany

[21] Appl. No.: 622,565

[22] Filed: Dec. 5, 1990

[30] Foreign Application Priority Data

Mar. 31, 1990 [DE] Fed. Rep. of Germany ....... 4010411

[51] Int. Cl.$^5$ .............................................. B60T 8/40
[52] U.S. Cl. .................................. 303/116 SP; 303/93
[58] Field of Search ............... 303/110, 113, 116, 119, 303/115, 93; 180/197

[56] References Cited

U.S. PATENT DOCUMENTS

| | | | |
|---|---|---|---|
| 4,509,802 | 4/1985 | Solleder et al. | 180/197 X |
| 4,726,630 | 2/1988 | Krohn et al. | 180/197 X |
| 4,793,662 | 12/1988 | Arikawa | 303/110 X |
| 4,865,397 | 9/1989 | Inoue et al. | 303/119 X |
| 4,900,102 | 2/1990 | Jonner et al. | 303/119 X |

FOREIGN PATENT DOCUMENTS 60-33158   2/1985   Japan ................................... 303/110

Primary Examiner—Robert J. Oberleitner
Assistant Examiner—Lee W. Young
Attorney, Agent, or Firm—Edwin E. Greigg; Ronald E. Greigg

[57] ABSTRACT

An hydraulic dual-circuit brake system with an antiskid system (ABS) and traction control (ASR) for motor vehicles has a four-channel hydraulic unit with electromagnetic control valves and a return pump with two separate pumping elements for each brake circuit. To supply brake pressure in traction control operation, an additional hydraulic unit is provided, which portions of connect the fluid tank to the return pump and switch the alternating connection of the outlet of the return pump to the master brake cylinder or to the brake fluid tank. For a rapid reduction of brake pressure in the wheel brake cylinders of the driven wheels at the onset of braking during traction control operation, the switch portion has at least one 3/3-way magnetic valve with a pressure limiting valve disposed in a valve bypass. This 3/3-way magnetic valve connects the outlet of the pumping element associated to one driven wheel to the master cylinder in a first position, and in a third position it connects it directly to the brake fluid tank. In a second position, all the working connections are blocked, so that a brake supply pressure can be built up.

9 Claims, 2 Drawing Sheets

HYDRAULIC DUAL-CIRCUIT BRAKE SYSTEM

BACKGROUND OF THE INVENTION

The invention is directed to improvements in a hydraulic dual-circuit brake system with an anti-skid system and traction control for motor vehicles, in particular passenger vehicles.

In a known dual-circuit brake system of this type (German Patent Document 38 16 073 A) the outlet channels of the four-channel hydraulic unit for the wheel brake cylinders of the driven wheels are assigned to one brake circuit, and the outlet channels for the wheel brake cylinders of the non-driven wheels are assigned to the other brake circuit. The various control valves in the outlet channel, for controlling a brake pressure as a function of wheel slip, are connected in pairs per brake circuit to the associated brake circuit outlets of the master brake cylinder via an inlet channel of the hydraulic unit and one connecting line each. Also connected to the same inlet channel is the outlet of the pumping element, operative in the applicable brake circuit, of the return pump. The switching means for connecting the return pump to the master cylinder or to the brake fluid tank have a reversing valve, which is disposed in the connecting line between the hydraulic unit inlet channel communicating with the brake circuit of the driven wheels and the one brake circuit outlet of the master brake cylinder. The connecting means for connecting the brake fluid tank to the return pump has a hydraulically controllable 2/2-way valve, disposed in the additional hydraulic unit, and a third pumping element, acting as a pre-charging pump, in the return pump; these are disposed in succession between the brake fluid tank the inlet to the pumping element that is associated with the brake circuit of the driven wheels. The control inlet of the 2/2-way valve is connected to one brake circuit outlet of the master brake cylinder. When there is control pressure at the control inlet, the multi-position valve is switched over to its blocking position. In traction control the reversing valve is reversed and now disconnects the brake circuit from the brake circuit output of the master brake cylinder, and connects the brake circuit to the brake circuit outlet of the master brake cylinder via a pressure-controlled valve. The precharging pump acting as a low-pressure pump now supplies the following pumping element, embodied as a high-pressure pump, of the return pump, which generates a high braking pressure that is present at the inlet to the control valve associated with the driven wheels. This brake pressure is fed via the control valves into the wheel brake cylinders of the driven wheels, which are slowed down as a result. If only one driven wheel is spinning, then the control valve associated with the outlet channel for the wheel brake cylinder of the nonspinning driven wheel is moved to its middle position, so that no brake pressure can be built up in the wheel brake cylinder of the driven wheel that is not spinning. By pressure modulation in the wheel brake cylinder associated with the slipping driven wheel, which modulation is effected by the control valve associated with that cylinder, a brake pressure that is adequate for slowing down the slipping driven wheel is built up. Once there is no longer a loss of traction, the control valve is moved to its terminal position by maximum current excitation; in this position, the outlet channels for both driven wheels communicate with the inlet of the associated pumping element of the return pump. Brake fluid is now pumped out of the wheel brake cylinder by the pumping element and returned to the brake fluid tank via the pressure-controlled valve. The brake pressure in the wheel brake cylinder is reduced fully once again.

Because of the pressure-controlled valve located in the return pumping circuit, the time between reversing the control valve to a terminal position until complete relief of the wheel brake cylinders of the driven wheels is relatively long. In normal traction control (ASR) operation this is no problem. However, if the brake pedal is actuated during traction control, then the brake system must terminate the traction control operation very quickly, which requires the fastest possible pressure relief of the driven wheel brake cylinders acted upon by brake pressure.

OBJECT AND SUMMARY OF THE INVENTION

It is a principal object and advantage of the dual-circuit brake system according to the invention that upon initiation of braking during traction control operation, the pressure relief of the driven wheel brake cylinders acted upon with brake pressure during traction control is effected via the 3/3-way magnetic valve, reversed into its terminal position, directly to the brake fluid tank, and thus is fast and independent of the return pump.

This embodiment of providing the switching means in the supplementary hydraulic unit for alternatingly connecting the return pump to the master brake cylinder or to the brake fluid tank, in the form of a 3/3-way magnetic valve, can be used both in dual-circuit brake systems with so-called front/rear distribution and in brake systems with diagonal brake circuit distribution. In the first instance, the 3/3-way magnetic valve is incorporated, along with its pressure limiting valve located in the valve bypass, in the connecting line between one brake circuit outlet of the master brake cylinder and the inlet channel of the four-channel hydraulic unit, to which both the control valves associated with the driven wheel brake circuit and the return pump pumping element associated with the outlet of the brake circuit are connected. In the second instance, a total of two 3/3-way magnetic valves, one each in a first and second connecting line between one each brake circuit outlet of the master brake cylinder and the inlet side of the control valve associated with a driven wheel, are used. Also connected to this connecting line is the respective outlet of a pumping element of the return pump.

It is another object and a further preferred embodiment of the invention to provide that the connection means in the additional hydraulic unit for connecting the brake fluid tank to the return pump has a precharging pump with a parallel-connected pressure limiting valve; this pump communicates on the outlet side with the return pump, via a check valve. In the instance of front/rear brake circuit distribution, the outlet of the precharging pump communicates via the check valve with the inlet of the return pump pumping element associated with the brake circuit of the driven wheels. In the instance of diagonal brake circuit distribution, the outlet of the precharging pump communicates via a respective check valve with the inlets of both pumping elements of the return pump.

The invention will be better understood and further objects and advantages thereof will become more ap-

DESCRIPTION OF THE PREFERRED EMBODIMENTS

Figure 1:
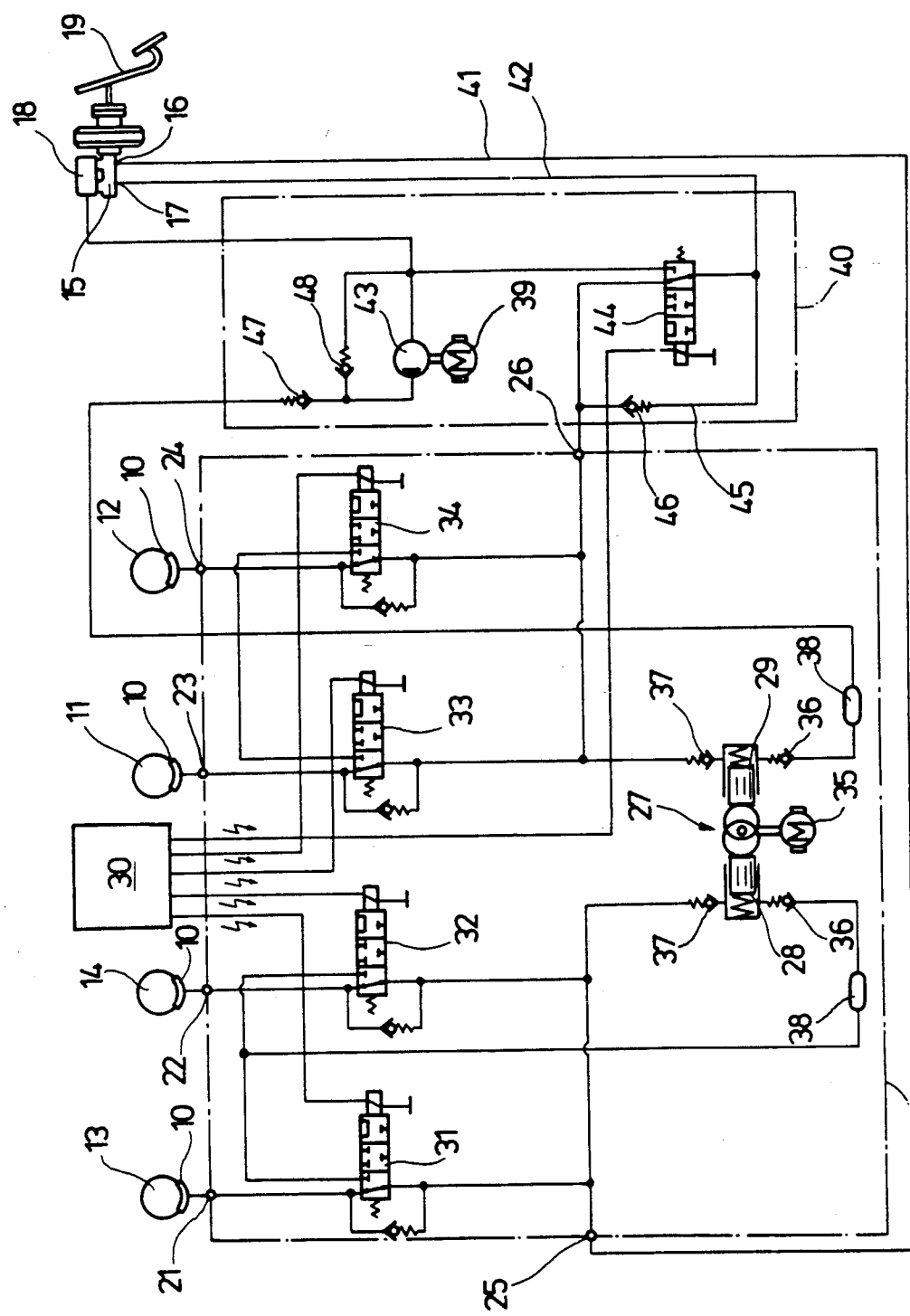
FIG. 1 is a block circuit diagram of a dual-circuit brake system with front/rear brake circuit distribution.

In the hydraulic dual-circuit brake system shown in FIG. 1 in the form of a block circuit diagram and having front/rear, or black/white distribution, anti-skid system (ABS) and traction control (ASR) for a passenger car, the wheel brake cylinders 10 of the driven wheels 11, 12 are disposed in one brake circuit, and the wheel brake cylinders 10 of the non-driven wheels 13, 14 are disposed in the other brake cylinder. The driven wheels 11, 12 are generally the rear wheels of the passenger car. In a manner known per se, the dual-circuit brake system includes a master brake cylinder 15, which has two brake circuit outlets 16, 17 each for connection to one of the two brake circuits, and which communicates with a brake fluid tank 18. Upon actuation of a brake pedal 19, a brake pressure of equal magnitude is fed into the brake circuits via the two brake circuit outlets 16, 17.

The dual-circuit brake system also includes a four-channel hydraulic unit 20, which has four outlet channels 21–24 and two inlet channels 25 and 26. Connected to each outlet channel 21–24 is one wheel brake cylinder 10 of the wheels 11–14. One control valve 31–34, embodied as a 3/3-way magnetic valve with spring restoration, is assigned to each outlet channel 21–24. The control valves 31–34 are controlled by an electronic control system 30 and build up a brake pressure dependent upon wheel spin by a wheel associated with a given wheel brake cylinder 10. A return pump 27, which is a component of the four-channel hydraulic unit 20, has two pumping elements 28, 29, which are driven in common by an electric motor 35. In traction control and ABS operation, the pumping elements 28, 29 serve to pump brake fluid out of the wheel brake cylinders 10 upon pressure reduction in the brakes. One pumping element 28, 29 is operative in each brake circuit and on the inlet side is connected to the third working connection each of the two control valves 31, 32 or 33, 34 associated with the same brake circuit and on the outlet side to one inlet channel 25, 26 each of the four-channel hydraulic unit 20. Upstream and downstream of each pumping element 28, 29 are a pump inlet valve 36,36' and a pump outlet valve 37, 37' respectively. Low-pressure reservoir chambers 38 connected to the inlet side of the pump inlet valve 36 allow a pressure reduction independently of the pump supply quantity and overcome the opening pressure of the pump inlet valve 36. The control valves 31–34 are connected on the inlet side by their first working connection each to one inlet channel 25 and 26 and with their second working connection to the associated outlet channel 21–24. The control valves 31–34 are embodied in a known manner such that in their first, non-excited basic valve position there is an unhindered passage from the inlet channels 25, 26 to the outlet channels 21–24, as a result of which the brake pressure controlled by the master brake cylinder 15 reaches the wheel brake cylinders 10 of the wheels 11–14. In the second, middle valve position, which is brought about by exciting the control valves 31–34 with half the maximum current, this passage is interrupted, and all the working connections are blocked, so that the brake pressure built up in the wheel brake cylinders 10 is kept constant. In the third, terminal valve position, which is established by valve excitation with maximum current, the outlet channels 21 and 22, and 23 and 24, respectively, and thus the wheel brake cylinders 10 of the wheels 11–14, are connected to the inlet of the pumping elements 28 and 29, respectively, so that to decrease the brake pressure brake fluid can be made to flow out of the wheel brake cylinders 10. The inlet channel 25 of the four-channel hydraulic unit 20 communicates via a first connecting line 41 with the brake circuit outlet 16 of the master brake cylinder 15, and the inlet channel 26 communicates via a second connecting line 42 with the brake circuit outlet 17 of the master brake cylinder 15.

An additional hydraulic unit 40 serves to generate a brake supply pressure in traction control (in the ASR mode). It has a precharging pump 43 embodied as a low-pressure pump and a 3/3-way magnetic valve 44 with spring restoration and a valve bypass 45, in which a pressure limiting valve 46 is disposed. The precharging pump 43 driven by an electric motor 39 is connected on the inlet side to a brake fluid tank 18 and on the outlet side, via a check valve 47, to the inlet of the pumping element 29 assigned to the brake circuit of the driven wheels 11, 12. Suitably, the connection of the precharging pump 43 is then carried via the connecting line leading from the control valve 33, 34 and containing the low-pressure reservoir 38 to the pumping element 29. A pressure limiting valve 48 is connected between the inlet and the outlet of the precharging pump 43.

The 3/3-way magnetic valve 44 is incorporated by its first and second working connections into the connecting line 42, so that the first working connection communicates with the inlet channel 26 of the four-channel hydraulic unit 20, and the second working connection communicates with the brake circuit outlet 17 of the master brake cylinder 15, while its third working connection communicates with the outlet of the brake fluid tank 18 or the inlet of the precharging pump 43. The 3/3-way magnetic valve 44 is controlled by the electronic control system, 30 and embodied such that in its unexcited basic position, shown in FIG. 1, it connects the first working connection to the second working connection, or in other words switches the second connecting line 42 to be open; in its middle position, brought about by excitation with half the maximum current, it blocks off all the working conditions; and in the third, terminal position brought about by excitation with maximum current, it connects the first working connection to the third working connection and thus connects the inlet channel 26 of the four-channel hydraulic unit 20 to the fluid tank 18.

The 3/3-way magnetic valve 44 is always moved to its middle position by the electronic control system 30 whenever the control system 30 is informed of a loss of traction of at least one of the driven wheels 11, 12 by wheel slip sensors, not shown here. In that case, the pumpinq element 29 of the actuated return pump 27, supplied by the actuated precharging pump 43, generates high pressure, which is applied to the control valves 33, 34 assigned to the outlet channels 24 for the wheel brake cylinders 10 of the driven wheels 11, 12. In this middle valve position all the working connections are blocked, and communication between the inlet channel 26 and the brake circuit outlet 17 of the master brake cylinder 15 exists only via the pressure limiting valve 46. The high brake pressure generated by the pumping element 29 is thus kept at a predetermined constant value.

If the driven wheel 11, for instance, is spinning, then the control valve 34 of the nonslipping driven wheel 12 is moved to the middle valve position, so that the outlet channel 24 is blocked by the high brake pressure generated by the pumping element 29. Via the other control valve 33, brake pressure is built up in the wheel brake cylinder 10 of the spinning driven wheel 11, which is thus slowed down. The necessary brake pressure is adjusted by pressure modulation, which is effected by switching of the control valve 33. Toward the end of traction control, once a loss of traction is no longer sensed, the relief of the wheel brake cylinders 10 is effected via the unexcited control valves and the unexcited 3/3-way magnetic valve 44, toward the master brake cylinder 11. If both driven wheels 11, 12 have a loss of traction, then both control valves 33, 34 are triggered for brake pressure modulation.

If the brake pedal 19 is actuated during traction control, then the control valves 33, 34 associated with the driven wheels 11, 12 and the 3/3-way magnetic valve 44 are all moved to the terminal valve position. As a result of the direct communication between the wheel brake cylinders 10 and the brake fluid tank 18, a wheel brake pressure built up in a wheel brake cylinder 10 is abruptly reduced, so that the brake system with anti-skid protection (ABS) is functional very quickly. Braking begins immediately in the non-driven wheels 13, 14. Braking can begin in the driven wheels 11, 12 after relief toward the brake fluid tank 18 and reversal of the 3/3-way magnetic valve 44.

Figure 2:
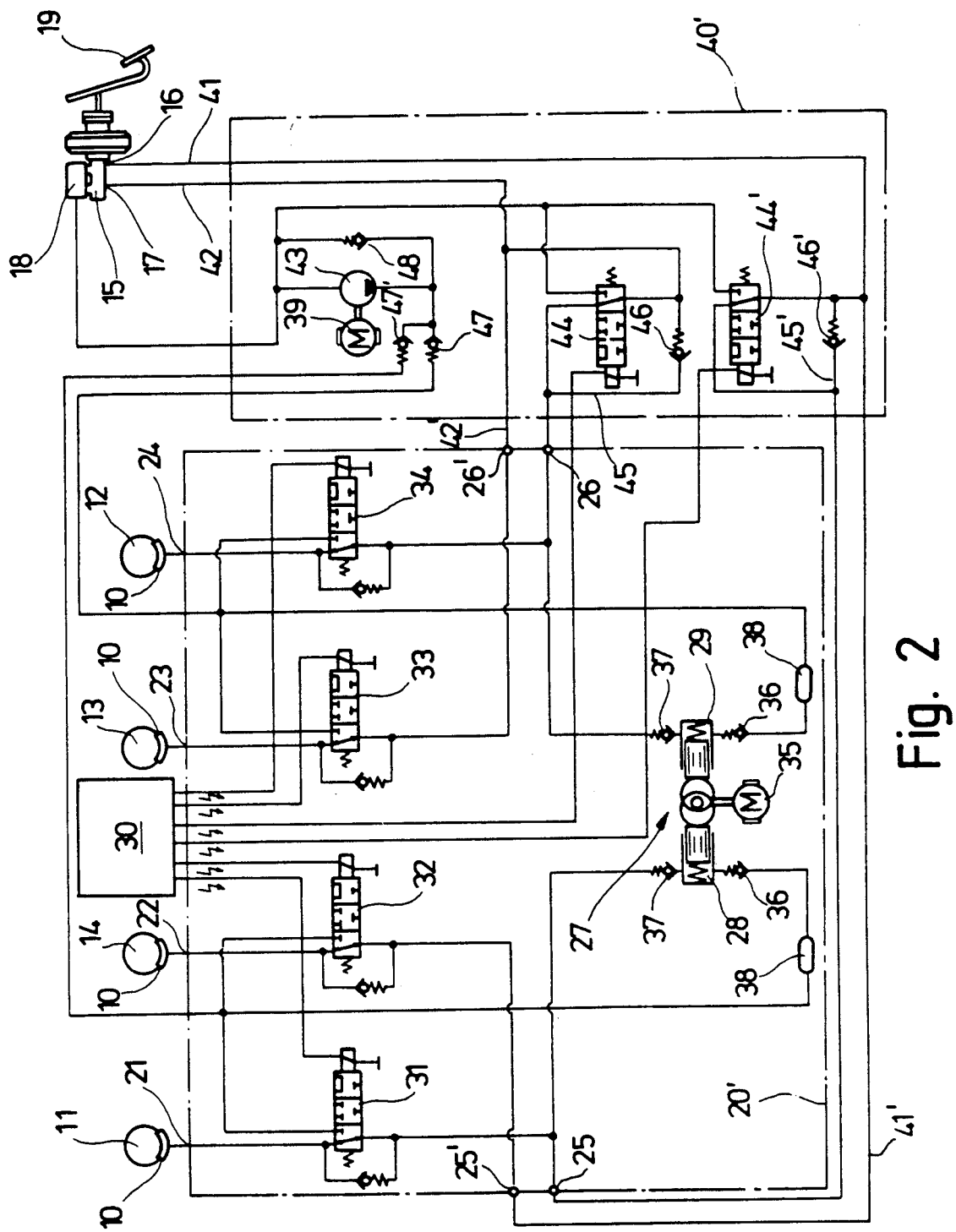
FIG. 2 is a block circuit diagram of a dual-circuit brake system with diagonal brake circuit distribution.

In the hydraulic fuel circuit brake system shown in the form of a block circuit diagram in FIG. 2, having diagonal brake circuit distribution, an anti-skid system (ABS) and traction control (ASR) for passenger cars, one driven wheel 11, 12 is assigned to each of two brake circuits. These driven wheels 11, 12 are in general the front wheels of the passenger car. To the extent that the dual-circuit brake system matches that described in FIG. 1 having front/rear brake circuit distribution, the same components are identified by the same reference numerals.

In the four-channel hydraulic unit 20, the two inlet channels 25, 26 are each divided into two channels 25 and 25' and 26 and 26', respectively. As before, the outlets of the pumping elements 28, 29 communicate with the inlet channels 25 and 26, respectively. The control valves 31 and 34, which are assigned to the driven wheels 11, 12 in each brake circuit, are still connected to the inlets 25, 26. The control valves 32, 33 assigned to the non-driven wheels 13, 14 are connected on the inlet side to the inlet channels 25' and 26'. The inlet channels 25' and 26' communicate with the brake circuit outlets 16, 17 of the master brake cylinder 15 through a third and fourth connecting line 41' and 42'. The additional hydraulic unit 40' has a second 3/3-way magnetic valve 44' as well, which is embodied identically to the 3/3-way magnetic valve 44 and is likewise provided with a bypass 45', in which there is a pressure limiting valve 46'. This 3/3-way magnetic valve 44' having the valve bypass 45' and the pressure limiting valve 46' is incorporated in the first connecting line 41 between the brake circuit outlet 16 of the master brake cylinder 15 and the inlet channel 25 of the four-channel hydraulic unit 20 in such a way that its first working connection is connected to the inlet channel 25, its second working connection is connected to the brake circuit outlet 16, and its third working connection is connected to the brake fluid tank 18. The 3/3-magnetic valve 44' is likewise triggered by the electronic control system 30. Additionally, the outlet of the precharging pump 43 in the additional hydraulic unit 40' is connected via a further check valve 47' to the inlet of the pumping element 28; the connection is again made via the connecting line, containing the low-pressure reservoir chamber 38, between the third working connections of the control valves 31, 32 and the pumping element 28.

The mode of operation of the dual-circuit brake system of FIG. 2 during traction control is the same as that described for FIG. 1, except that now two 3/3-way magnetic valves 44 and 44' are triggered in the described manner.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. An hydraulic dual-circuit brake system with an anti-skid system and traction control for motor vehicles, comprising a master brake cylinder with two separate brake circuit outlets for controlling a brake pressure by brake pedal actuation; a brake fluid tank communicating with the master brake cylinder; a four-channel hydraulic unit connected to the two separate brake circuit outlets of the master brake cylinder, said hydraulic unit having four outlet channels for connecting wheel brake cylinders of the vehicle wheels, control valves embodied as 3/3-way magnetic valves provided with spring restoration each associated with one outlet channel for controlling a brake pressure as a function of wheel slip, a return pump with two separate pumping elements, each effective in one brake circuit, for returning brake fluid from the wheel brake cylinders into the master brake cylinder upon brake pressure reduction, said pumping elements connected on an inlet side via the control valves to outlet channels belonging to the one brake circuit and on an outlet side to the brake circuit outlet of the master brake cylinder associated with that brake circuit; an additional hydraulic unit for generating a brake supply pressure for traction control, said additional hydraulic unit having connection means for connecting the brake fluid tank to the inlet of the return pump and switching means for alternatingly connecting the outlet of the return pump to the master brake cylinder or to the brake fluid tank, the switching means having at least one 3/3-way magnetic valve (44) provided with spring restoration and a pressure limiting valve (46) disposed in a valve bypass (45); said 3/3-way magnetic valve (44) having three controlled valve connections, a first said valve connection communicating with the outlet of a pumping element (29) of the return pump (27) associated with one brake circuit having at least one driven wheel (11, 12), a second said valve connection communicating with that brake circuit outlet (17) of the master brake cylinder (15) associated with that brake circuit, a third said valve connection communicating with the brake fluid tank (18); and the switching means 3/3-way magnetic valve (44) is embodied such that the first valve connection, in an unexcited first valve position communicates with the second valve connection and, in a third valve position established by maximum current excitation, communicates with the third valve connection, and in a second valve position, adjustable by excitation with half the maximum current, all the valve connections are blocked.

2. A brake system as defined by claim 1, further comprising two driven wheels (11, 12) are disposed in the same brake circuit; the control valves (33, 34) assigned to this brake circuit are connected on the inlet side, along with the outlet of the pumping element (29), belonging to this brake circuit, of the return pump (27), to an inlet channel (26) of the four-channel hydraulic unit (20); the switching means 3/3-way magnetic valve (44) is incorporated, with the pressure limiting valve (46) located in the valve bypass (45), in a connection line (42) provided between the inlet channel (26) and the brake circuit connection (17); and a connecting means connects the brake fluid tank (18) to the inlet of the pumping element (29) associated with the brake circuit of the driven wheels (11, 12).

3. A brake system as defined by claim 1, further comprising two driven wheels (11, 12) belong to different brake circuits; the control valves (31, 34) associated with the driven wheels (11, 12) for each brake circuit are connected on the inlet side, each together with the outlet of one pumping element (28, 29), via a first and a second connecting line (25, 26), and the control valves (32, 33) associated with the non-driven wheels (13, 14) are connected via a third and fourth connecting line (41', 42') to the two brake circuit outlets (16, 17) of the master brake cylinder (15); said switching means further comprises one 3/3-way magnetic valve (44, 44') provided with a pressure limiting valve (46, 46') disposed in a valve bypass (45, 45') is incorporated into each of the first and second connecting lines (25, 26); and the connecting means (43) connect the brake fluid tank (18) to the inlets of both pumping elements (28, 29) of the return pump (27).

4. A brake system as defined by claim 1, further comprising the connecting means have a precharging pump (43), which is connected on an inlet side to the brake fluid tank (18) and on the outlet side, via a check valve (47, 47'), to the inlet of at least one of said pumping elements (28, 29) of the return pump (27).

5. A brake system as defined by claim 2, further comprising the connecting means have a precharging pump (43), which is connected on an inlet side to the brake fluid tank (18) and on the outlet side, via a check valve (47, 47'), to the inlet of at least one of said pumping elements (28, 29) of the return pump (27).

6. A brake system as defined by claim 3, further comprising the connecting means have a precharging pump (43), which is connected on an inlet side to the brake fluid tank (18) and on the outlet side, via a check valve (47, 47'), to the inlet of at least one of said pumping elements (28, 29) of the return pump (27).

7. A brake system as defined by claim 4, further comprising a pressure limiting valve (48) is connected parallel to the precharging pump (43).

8. A brake system as defined by claim 5, further comprising a pressure limiting valve (48) is connected parallel to the precharging pump (43).

9. A brake system as defined by claim 6, further comprising a pressure limiting valve (48) is connected parallel to the precharging pump (43).

* * * * *